(12) United States Patent
Ungruh et al.

(10) Patent No.: US 6,213,675 B1
(45) Date of Patent: Apr. 10, 2001

(54) AXIAL JOINT

(75) Inventors: Rainer Ungruh, Hörstel; Norbert Schmudde, Osnabrück; Gerhard Hüneke, Wallenhorst; Dieter Müller, Damme, all of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/200,216

(22) Filed: Nov. 25, 1998

(30) Foreign Application Priority Data

Dec. 11, 1997 (DE) .............................................. 197 55 020

(51) Int. Cl.$^7$ ...................................................... F16C 11/08
(52) U.S. Cl. .......................... 403/135; 403/132; 403/140; 29/898.047
(58) Field of Search ..................................... 403/135, 133, 403/132, 140, 122, 137, 141, 143; 29/898.043, 898.044, 898.045, 898.046, 898.047

(56) References Cited

U.S. PATENT DOCUMENTS

| | | |
|---|---|---|
| 703,899 | 7/1902 | Debes . |
| 1,943,631 * | 1/1934 | Skillman ........................ 29/898.046 |
| 1,960,956 * | 5/1934 | Riedel ............................ 29/898.047 |
| 1,971,184 | 8/1934 | Hufferd et al. . |
| 3,238,602 | 3/1966 | White . |
| 3,667,789 | 6/1972 | McNeely et al. . |
| 3,825,356 * | 7/1974 | Crook, Jr. ............................ 403/122 |
| 4,577,988 * | 3/1986 | Gollub et al. ......................... 403/140 |
| 4,695,181 * | 9/1987 | Rahmede et al. ..................... 403/135 |
| 4,725,159 * | 2/1988 | Wood, Jr. ............................. 403/133 |
| 4,875,794 * | 10/1989 | Kern, Jr. .............................. 403/132 |
| 4,916,788 * | 4/1990 | Mitoya ............................. 29/898.044 |
| 4,995,755 * | 2/1991 | Hyodo et al. ......................... 403/133 |
| 5,116,159 * | 5/1992 | Kern, Jr. et al. ...................... 403/132 |
| 5,188,477 * | 2/1993 | Idosako et al. ....................... 403/133 |
| 5,195,605 * | 3/1993 | Wood .................................. 180/254 |
| 5,509,748 * | 4/1996 | Idosako et al. ....................... 403/133 |
| 5,813,789 * | 9/1998 | Prickler et al. ....................... 403/135 |
| 5,851,082 * | 12/1998 | Schmudde et al. ................... 403/133 |

FOREIGN PATENT DOCUMENTS

| | | |
|---|---|---|
| 2 234 338 | 1/1974 | (DE) . |
| 2 244 645 | 3/1974 | (DE) . |
| 0 026 864 B1 | 4/1984 | (EP) . |
| 932 103 | 7/1963 | (GB) . |
| 2404853 * | 8/1974 | (GB) ................................... 403/133 |
| 2052619 * | 1/1981 | (GB) ................................... 403/140 |

\* cited by examiner

Primary Examiner—Harry C. Kim
(74) Attorney, Agent, or Firm—McGlew and Tuttle, P.C.

(57) ABSTRACT

An axial joint and a process for manufacturing an axial joint are described. The axial joint comprises a metallic housing (1) with an opening (2) and with an interior space (9), with a ball pivot (3), which has a joint ball (4) and a pivot pin (5). The joint ball (4) is surrounded for the most part by the housing (1) and a pivot pin neck (5.1) of reduced diameter compared with that of the pivot (5) is present in the transition area between the joint ball (4) and the pivot pin (5), and the pivot pin (5) projects through the opening (2) of the housing. The axial joint also has a bearing shell (6; 6.1, 6.2), which consists essentially of plastic and is arranged between the housing (1) and the joint ball (4), and the metallic housing is made in one piece.

21 Claims, 3 Drawing Sheets

AXIAL JOINT

FIELD OF THE INVENTION

The present invention pertains to an axial joint, especially an axial joint used in automotive engineering, especially in the area of the steering and shifting of a vehicle.

BACKGROUND OF THE INVENTION

A similar axial joint has been known from EP 0 026 864 B1. This patent specification discloses an axial joint, whose task it is to have a low frictional resistance for relatively small movements and a relatively higher frictional resistance for large movements. This axial joint comprises a two-part metallic housing with a cylindrically spherical interior space and two openings along the cylindrical axis. A ball pivot with a joint ball and a pin are located within the housing, and the joint ball is surrounded by the housing and the pin projects from the housing through the smaller of the openings, which are located in the area of the spherical part of the housing. A large opening, through which the ball pivot can be introduced into the interior of the housing, is arranged in the cylindrical area of the housing. A two-part bearing shell is provided between the housing and the ball pivot over an essential part of the surface. The bearing shell ensures easy mobility of the ball pivot or a varying mobility in the embodiment shown there, depending on the deflection of the ball pivot. One part of the bearing shell is made spherical both on the inside and on the outside, while the second part of the bearing shell is made cylindrical in the outer area, corresponding to the metallic housing, and it has a spherical design in the inner area, corresponding to the surface of the joint ball of the ball pivot.

When manufacturing the ball pivot, the ball pivot is introduced after inserting the spherical part of the bearing shell into the housing. The cylindrically spherical bearing shell is then placed on the ball pivot in the cylindrical part and an essentially flat cover is fitted onto the cylindrical part of the housing such that it presses the two bearing shells firmly into the housing and around the joint ball of the ball pivot.

One drawback of this prior-art design of an axial joint is that the manufacture of this axial joint, comprising a plurality of parts, is relatively complicated. Furthermore, it is problematic in this design to provide a good connection between the housing and a vehicle part on the side opposite the pivot of the ball-and-socket joint.

SUMMARY AND OBJECTS OF THE INVENTION

The primary object of the present invention is to manufacture an axial joint, especially for use in the manufacture of a chassis, and especially for use in the manufacture of shifting and steering means, in which the drawbacks of the state of the art are avoided. Another object of the present invention is to describe a simple process for manufacturing this axial joint according to the present invention.

According to the invention, an axial joint is provided which comprises a metallic housing with an opening and an interior space as well as a ball pivot with a joint ball. The ball pivot has a pivot neck between its pivot pin and the joint ball and the joint ball is surrounded for the most part by the housing. The pivot pin projects through the opening of the housing. At least one bearing shell, made essentially of plastic, is arranged between the housing and the joint ball. The housing is metallic and made in one piece.

This one-piece design offers the inherent advantage that a substantially simpler and less expensive manufacture is made possible compared with the state of the art.

According to a variant of the object of the present invention, the axial joint may be shaped such that after the mounting of the axial joint, the diameter of the joint ball is substantially larger than the diameter of the opening of the housing, and the latter is in turn substantially smaller than the axial extension of the pivot neck. It is achieved as a result that a current weak point of axial joints, namely, the insufficient ability to transmit a tensile force along the axis of the ball pivot, is improved. In addition, it is achieved due to the design of the ball-and-socket joint according to the present invention that the angular deflections of the ball pivot in the ball-and-socket joint can also be increased.

According to another variant of the axial joint according to the present invention, the bearing shell may be made of two parts, and, in an additional variant, at least one part of the bearing shell, preferably the one located closest to the opening of the housing, may be made of a plastic-metal composite. It is achieved as a result that a substantially more favorable production is possible and that commercially available parts may also be used for the bearing shell, especially for the cylindrical area or for the originally cylindrical area. Furthermore, a substantially higher load-bearing capacity of a joint according to the present invention, a considerable weight reduction, and improved temperature stability are achieved compared with prior-art axial joint designs. The improved temperature stability of the composite bearing shell reduces the adverse effects of temperature-dependent component tolerances, so that a favorable effect on the frictional properties of the components of the joint is obtained as a result. Nearly constant friction is achieved.

According to another variant of the axial joint according to the present invention, a damping ring, which may consist of, e.g., rubber or another elastomer, is inserted between the bearing shell and the housing. A possible transmission of vibrations from the bearing shell to the ball pivot and vice versa is reduced by means of this damping ring. In addition, such a damping ring generates a pretension as a secondary effect, i.e., a constant pressing of the bearing shell against the joint ball, so that vibrations, which could be generated by an undesirable clearance in the axial joint, are avoided.

In another embodiment of the axial joint, a housing pin is provided at the housing, which is made in one piece according to the present invention. This housing pin may be arranged, e.g., opposite the opening of the housing, i.e., opposite the projecting pivot of the ball pivot. Simple connection of the ball-and-socket joint to a vehicle part is possible as a result. The housing pin may also be provided, e.g., with a connection contour, such as threads, so that the axial joint can be screwed directly into another threaded hole.

Corresponding to another idea of the present invention, the axial joint is manufactured by cold forming an initially cylindrical part of the housing around the joint ball with a bearing shell arranged between the housing and the joint ball. This process makes it advantageously possible to manufacture an axial joint with a one-piece housing, which can also absorb tensile forces and in which welding of the housing is not necessary.

According to another feature of the present invention, a process for manufacturing an axial joint with the following process steps is disclosed:

1. Insertion of a bearing shell, which is cylindrical over its essential part, into a one-piece metallic housing, which is likewise cylindrical over its essential part and has an opening on one side, 2. insertion of a preferably metallic joint ball of a ball pivot into the hollow space of the bearing shell, and 3. cold forming of an essentially cylindrical part of the housing, so that an essential part of the initially cylindrical part of the bearing shell and of the initially cylindrical part of the housing fits the outer contour of the joint ball.

It is obvious that the above-mentioned features of the present invention, which will be explained below, can be used not only in the particular combination described, but also in other combinations or alone without going beyond the scope of the present invention.

Additional features and advantages of the present invention appear from the following description of preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
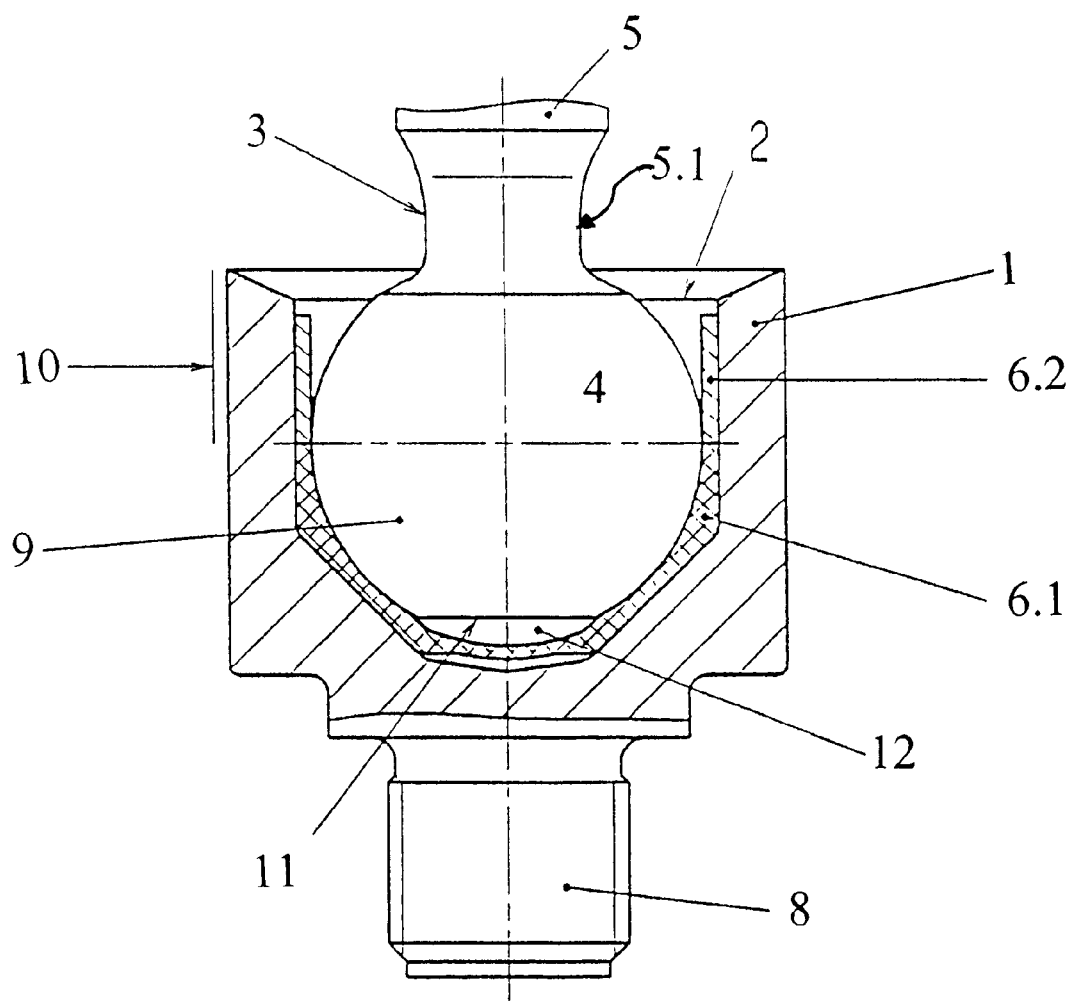
FIG. 1 is a partial sectional view of an axial joint without damping ring before the deformation.

Referring to the drawings in particular, FIG. 1 shows a cross section through an axial joint during the manufacturing process. The axial joint has a metallic housing 1, which has an interior space, which has a cylindrical section, a conical section with an angle of about 45°, and a flat conical section. A bearing shell 6, which comprises two parts 6.1 and 6.2, is inserted into the said interior space 9. The part 6.1 consists entirely of plastic, e.g., Teflon. The cylindrical part 6.2 is designed as a cylindrical sleeve made of a metal-plastic composite. A preferably metallic ball pivot 3 is inserted into the bearing shell, so that the joint ball 4 is in contact with the inside of the bearing shell 6 over a wide area of its surface. The ball pivot 3 includes a pivot pin 5 and a pivot neck 5.1.

An essential section 10 of the cylindrical housing 1 is pressed against the inner joint ball 4 by cold forming during the manufacturing process.

Figure 2:
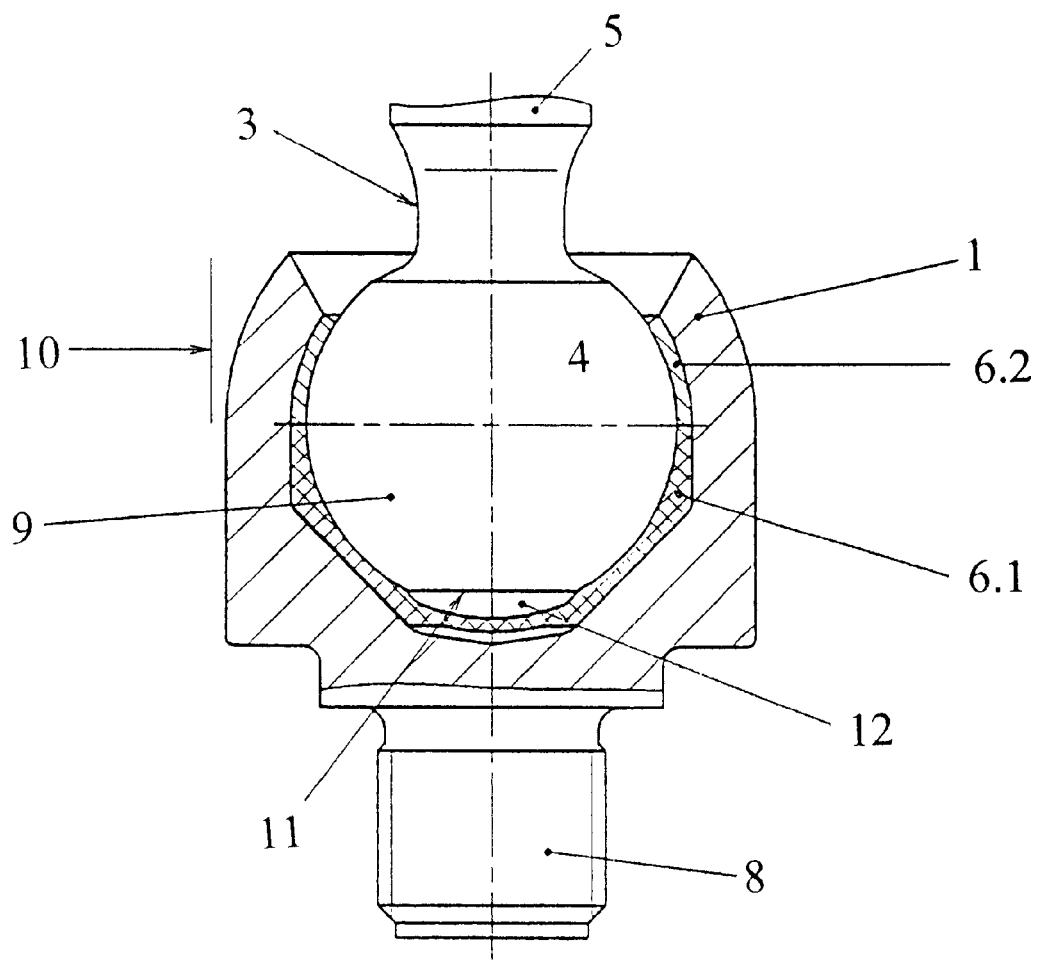
FIG. 2 is a partial sectional view of an axial joint without damping ring after the deformation.

FIG. 2 shows the finished axial joint after the cold forming of the metallic housing. Deformation of the inner, cylindrical part 6.2 of the bearing shell is also brought about by the deformation of the housing 1, so that the joint ball in the finished axial joint is in contact with its surface with the inner surface of the bearing shell, at least over an essential area.

The originally large opening 2 of the housing, through which the joint ball 4 of the ball pivot 3 is inserted into the interior space of the housing, is reduced by the cold forming of the housing 1, so that the diameter of the opening 2 is smaller in the finished state of the axial joint than the diameter of the joint ball 4. It is thus possible to also transmit even relatively strong tensile forces in the direction of the longitudinal axis of the axial joint with this axial joint according to the present invention.

A housing pin 8, with which the ball-and-socket joint according to the present invention can be connected to other parts of the vehicle in a simple manner, is arranged on the bottom side of the housing 1 in FIGS. 1 and 2. If the housing pin 8 is provided with threads, the entire ball-and-socket joint can be screwed into a corresponding threaded hole of another vehicle part in a simple manner.

On its underside, the joint ball 4 has a flattened area 11, which forms a hollow space 12 together with the curved bearing shell 6.1, and the said hollow space 12 may be filled with, e.g., a lubricant.

Figure 3:
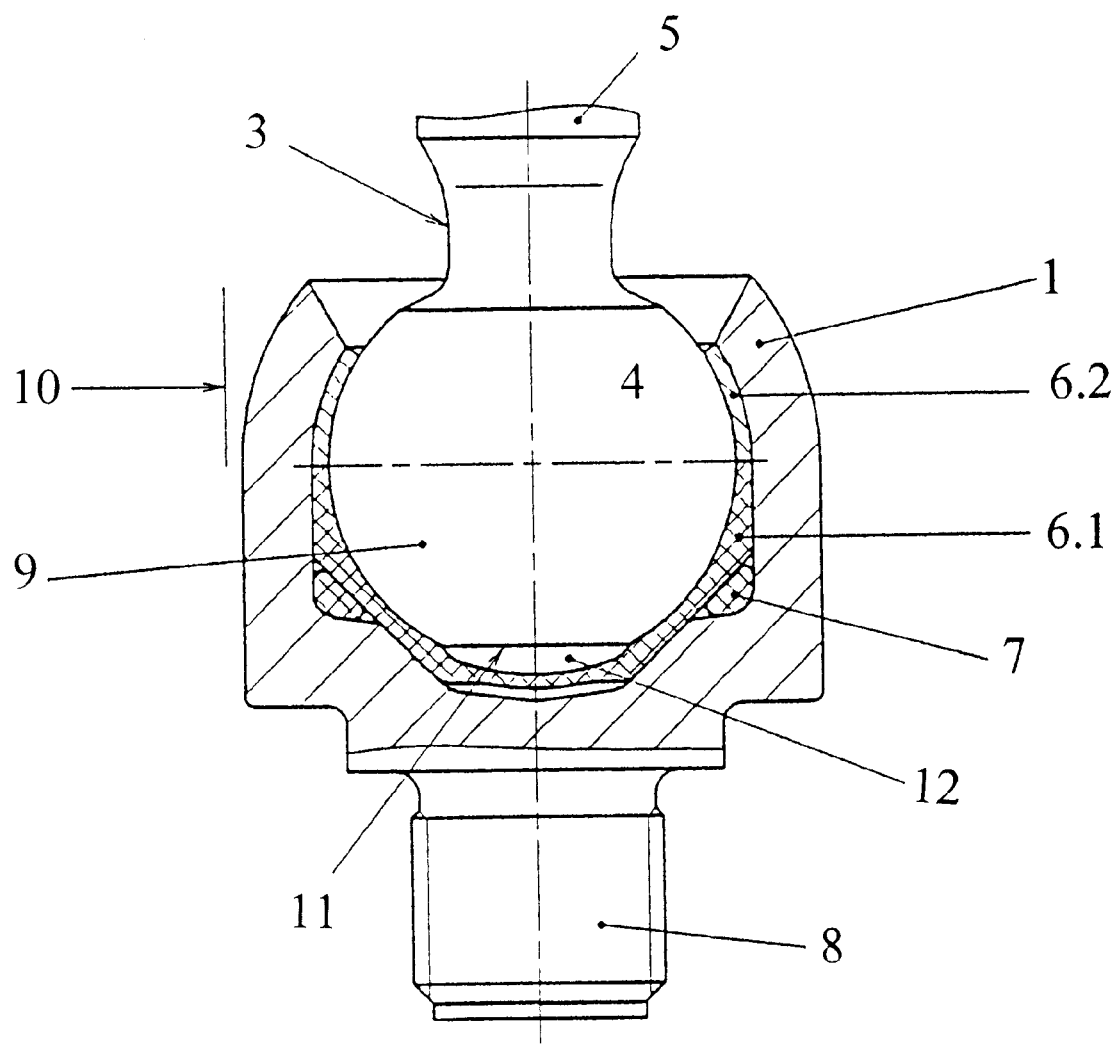
FIG. 3 is a partial sectional view of a finished axial joint with damping ring.

FIG. 3 shows a cross section through an axial joint according to the present invention in the finished state. Unlike the axial joint shown in FIGS. 1 and 2, this axial joint has an additional, inner shoulder, into which a damping ring 7 is inserted. This damping ring 7 brings about an additional damping and potension between the bearing shell 6 and the outer housing 1.

The manufacturing process for this ball-and-socket joint corresponds essentially to the manufacturing process of the ball-and-socket joint according to FIGS. 1 and 2. This includes inserting the bearing shell 6, which is cylindrical over its essential part, into the one-piece metallic housing 1, which is likewise cylindrical over its essential part and has an opening on one side. The preferably metallic joint ball of a ball pivot is inserted into the hollow space of the bearing shell which is cylindrical over its essential part. The essentially cylindrical part of the housing is cold formed, so that an essential part of the initially cylindrical part of the bearing shell and of the initially cylindrical part of the housing fits the outer contour of the joint ball.

The present invention now provides an axial joint that can be manufactured in a simple manner and thus at a favorable cost. Furthermore, it is also possible now to arrange a pin for connection to another vehicle part on the side located opposite the ball pivot on the housing in a simple manner in this ball-and-socket joint according to the present invention. It is thus also possible to transmit relatively strong tensile forces along the longitudinal axis of the axial joint and thus to take novel approaches in design.

While specific embodiments of the invention have been shown and described in detail to illustrate the application of the principles of the invention, it will be understood that the invention may be embodied otherwise without departing from such principles.

APPENDIX

List of Reference Numbers:

1 Housing
2 Opening
3 Ball pivot
4 Joint ball
5 Pivot
5.1 Pivot neck
6 Bearing shell
6.1 Cylindrical/spherical part of the bearing shell made of plastic
6.2 Cold-formed part of the bearing shell made of metal-plastic composite
7 Damping ring
8 Housing pin
9 Interior space
10 Cylindrical section of the bearing shell 11 Flattened area
12 Hollow space

What is claimed is:

1. An automotive engineering steering and shifting device axial joint, comprising:
   a metallic housing with an opening and with an interior space;
   a ball pivot which has a joint ball, a pivot pin and a pivot neck of reduced diameter compared with a diameter of said pivot pin, said pivot neck being present in a transition area between said joint ball and said pivot pin, said joint ball being substantially surrounded by said housing for the most part wherein said pivot pin projects through said opening of said housing; and
   a bearing shell formed essentially of plastic, said bearing shell being arranged between said housing and said joint ball, said metallic housing being made in one piece, part of said bearing shell being formed of a plastic-metal composite.

2. The axial joint in accordance with claim 1, wherein said housing has only one said opening.

3. The axial joint in accordance with claim 1, wherein after the mounting of the joint, a diameter of said joint ball is substantially larger than a diameter of said opening of said housing and this is substantially smaller than an axial extension of said pivot neck.

4. The axial joint in accordance with claim 1, wherein said bearing shell is made of two parts.

5. The axial joint in accordance with claim 1, wherein a damping ring is provided between said bearing shell and said housing.

6. The axial joint in accordance with claim 5, wherein the smallest internal diameter of said damping ring is smaller than an external diameter of said joint ball.

7. The axial joint in accordance with claim 5, wherein said damping ring is formed of an elastomer.

8. The axial joint in accordance with claim 5, wherein said damping ring is formed of rubber.

9. The axial joint in accordance with claim 1, wherein said housing has a housing pin.

10. The axial joint in accordance with claim 9, wherein said housing pin is provided opposite said opening of said housing.

11. The axial joint in accordance with claim 1, wherein the said interior space of said housing has at least one of a flat section and a conical section.

12. The axial joint in accordance with claim 1, wherein said interior space of said housing has at least one cylindrical section.

13. The axial joint in accordance with claim 1, wherein said interior space of said housing has at least one essentially spherical section.

14. The axial joint in accordance with claim 1, wherein said joint ball of said ball pivot has a flattened area on a side located opposite said pivot pin and a hollow space is provided between said bearing shell and said joint ball in a region adjacent to said flattened area.

15. The axial joint in accordance with claim 1, wherein the joint is manufactured by cold forming an initially cylindrical part of said housing around said joint ball with said bearing shell arranged between said housing and said joint ball.

16. The axial joint in accordance with claim 15, wherein an initially cylindrical part of said bearing shell is fitted to an outer contour of said joint ball with the deformation process of said initially cylindrical part of said housing.

17. The axial joint in accordance with claim 16, wherein said initially cylindrical part of said bearing shell formed essentially of plastic includes said plastic-metal composite.

18. A process for manufacturing an axial joint, the process comprising the steps of:
   inserting a bearing shell which is essentially cylindrical over a part and consists essentially of plastic, into a metallic, one-piece housing which is likewise essentially cylindrical over a part and which has an opening on one side;
   inserting a metallic joint ball of a ball pivot into a hollow space of said bearing shell;
   cold forming said essentially cylindrical part of the said housing so that said essentially cylindrical part of said bearing shell and said essentially cylindrical part of said housing are fitted to an outer contour of said joint ball, said bearing shell including a plastic-metal composite, which is cylindrical before deformation resulting from said step of cold forming.

19. A process for manufacturing an axial joint, the process comprising the steps of:
   inserting a bearing shell which is essentially cylindrical over a part and consists essentially of plastic, into a metallic, one-piece housing which is likewise essentially cylindrical over a part and which has an opening on one side;
   inserting a metallic joint ball of a ball pivot into a hollow space of said bearing shell;
   cold forming said essentially cylindrical part of the said housing so that said essentially cylindrical part of said bearing shell and said essentially cylindrical part of said housing are fitted to an outer contour of said joint ball, said two-part bearing shell including a plastic-metal composite, which is cylindrical before deformation resulting from said step of cold forming.

20. An axial joint comprising:
   a metallic housing with an opening and with an interior space, said metallic housing being made in one piece;
   a ball pivot which has a joint ball and a pivot pin, said joint ball being substantially surrounded by said housing with said pivot pin projecting through said opening of said housing;
   a bearing shell arranged between said housing and said joint ball, part of said bearing shell being formed of a plastic-metal composite, said metallic housing being cold formed around said joint ball in an area of said opening, said bearing shell being deformed by said cold formed housing.

21. An axial joint in accordance with claim 20, wherein:
   said housing being made in one piece surrounds said joint ball at an axial end of said ball pivot.

* * * * *